US008279536B2

United States Patent
Hsu et al.

(10) Patent No.: US 8,279,536 B2
(45) Date of Patent: Oct. 2, 2012

(54) FIXED FOCUS LENS AND IMAGING SYSTEM

(75) Inventors: Ya-Ling Hsu, Hsin-Chu (TW);
Long-Sheng Liao, Hsin-Chu (TW);
Sung-Nan Chen, Hsin-Chu (TW);
Chao-Shun Chen, Hsin-Chu (TW)

(73) Assignee: Young Optics Inc. (TW)

( * ) Notice: Subject to any disclaimer, the term of this patent is extended or adjusted under 35 U.S.C. 154(b) by 130 days.

(21) Appl. No.: 12/801,943

(22) Filed: Jul. 2, 2010

(65) Prior Publication Data
US 2011/0002051 A1    Jan. 6, 2011

(30) Foreign Application Priority Data

Jul. 3, 2009   (TW) ................................ 98122618 A

(51) Int. Cl.
G02B 17/00    (2006.01)

(52) U.S. Cl. ...................................................... 359/726

(58) Field of Classification Search .................. 359/726, 359/727, 364; 353/37, 102, 77
See application file for complete search history.

(56) References Cited

U.S. PATENT DOCUMENTS 6,631,994 B2    10/2003  Suzuki et al.
7,448,760 B2 *  11/2008  Yamagishi ....................... 353/98

FOREIGN PATENT DOCUMENTS
EP    1965254    9/2008

OTHER PUBLICATIONS

"Ultra-Short and Throw LCD Projector HCP-A8 with free-curved technology," Pconline Office Equipment Channel, Mar. 5, 2008, 2 pages, http://big5.pconline.com.cn/b5/office.pconline.com.cn/solution/0803/1237177.html.

* cited by examiner

Primary Examiner — Alicia M Harrington
(74) Attorney, Agent, or Firm — MH2 Technology Law Group LLP

(57) ABSTRACT

A fixed-focus lens capable of imaging a light valve disposed at a reduced side onto a magnified side is provided. The fixed-focus lens includes a first lens group, a second lens group, and a free form reflective mirror. The first lens group is disposed in the light path between the reduced side and the magnified side. The second lens group is disposed in the light path between the first lens group and the magnified side and includes a first free form lens. The free form reflective mirror is disposed in the light path between the second lens group and the magnified side. An imaging surface imaged from the light valve by the fixed-focus lens is a curved surface. An imaging system using the fixed-focus lens is also provided.

16 Claims, 12 Drawing Sheets

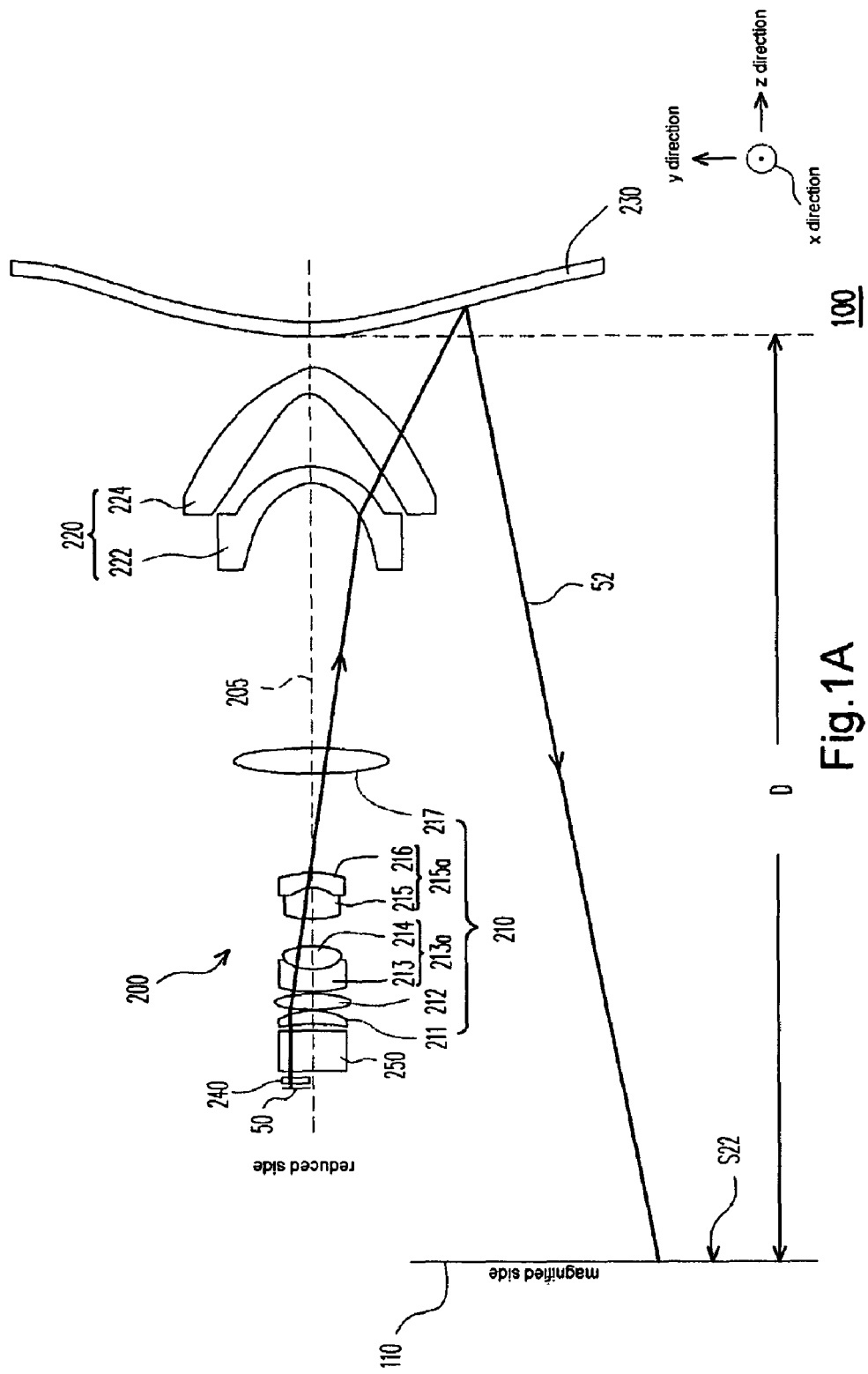

FIXED FOCUS LENS AND IMAGING SYSTEM

CROSS-REFERENCE TO RELATED APPLICATION

This application claims the priority benefit of Taiwan application serial no. 98122618, filed on Jul. 3, 2009.

BACKGROUND OF THE INVENTION

1. Field of the Invention

The invention generally relates to a lens and an imaging system, and more particularly, to a fixed-focus lens and an imaging system having the fixed-focus lens.

2. Description of Related Art

With the development of display technology, new displays such as a liquid crystal display (LCD), a plasma display panel (PDP), and a projection apparatus have taken the place of the conventional cathode ray tub (CRT). The LCD, PDP, and other panel display may occupy larger domestic market as a result of the smaller thickness. However, the projection apparatus may provide a larger size image (more than 52 inches, for example) at a lower cost, so the projection apparatus may occupy certain market. In addition, the large size image may be seen by more people, so the projection apparatus is convenient for processing a meeting, a displaying bulletin, and showing teaching information. The advantage of the projection apparatus is one of the reasons that the projection apparatus may not be substituted. In recent years, the projection apparatus gradually becomes one of the indispensable home appliances using in home theatre.

In the projection apparatus, the image showing on the light valve is small and fine, wherein the light valve is a liquid-crystal-on silicon panel (LCOS panel) or a digital micro-mirror device (DMD) for example. To project the small image on the light valve onto the screen to form a large image, a projection lens is capable of projecting the image beam from the light valve onto the screen. In addition, in recent years, to project a large image within short distance, free form surface technology is developed. The free form surface is any curved surface expressed through mathematical expressions, and may be nonaxisymmetrical curved surface for example.

For example, the projector HCP-8A developed by Hitachi company adopts a free form lens and a free form reflective mirror, wherein the free form reflective mirror may be used for trapezoidal correction to reduce distortion. In addition, the aspherical lens is used to correct comatic aberration and point spherical aberration. Also, EP patent publication number No. 1965254A1 discloses a projection lens adopting a free form reflective mirror and a free form lens. Moreover, U.S. Pat. No. 6,631,994 discloses a rear projection apparatus adopting the curved reflective mirror.

The above-mentioned projection lenses all project the light valve to the plane screen, and the imaging surface is a plane. However, the projection systems adopting the plane screen may lack in-situ feel when the projection systems adopting the plane screen is used to a video conference. Therefore, some conventional projection systems used in the video conference adopt a curved screen to increase in-situ feel. However, the conventional projection systems adopt a conventional lens to project the light valve onto the curved screen, the imaging surface formed by the conventional lens is a plane, and the imaging surface may not coincide with the curved screen.

To solve the problem that the imaging surface may not coincide with the curved surface, some conventional technology adopts the projection lens with longer focus, but the technology may stretch the projection distance and make the projection system become too large. In addition, because the imaging surface may not coincide with the curved screen, the image on the screen may generate geometric distortion. A conventional improving method is to correct the geometric distortion by adopting the method of a signal process. Although, the distortion image on the screen may be corrected to a normal image after the signal process, the effective pixels have been reduced, and the illumination of the image may be reduced too.

SUMMARY OF THE INVENTION

The invention provides a fixed-focus lens, and the fixed-focus lens may produce a curved image.

The invention provides an imaging system capable of being used in projection apparatus to produce a curved image to increase in-situ feel. The geometric distortion of the image may be reduced, and the illumination may be increased.

Other objectives and advantages of the invention may be further understood from the technical features disclosed in the invention.

To achieve at least one of the above-mentioned objectives, or to achieve other objectives, an embodiment of the invention provides a fixed-focus lens capable of imaging a light valve disposed at a reduced side onto a magnified side. The fixed-focus lens includes a first lens group, a second lens group, and a free form reflective mirror. The first lens group is disposed in the light path between the reduced side and the magnified side. The second lens group is disposed in the light path between the first lens group and the magnified side, and the second lens group includes a first free form lens. The free form reflective mirror is disposed in the light path between the second lens group and the magnified side, wherein an imaging surface imaged from the light valve by the fixed-focus lens in the magnified side is a curved surface.

In one embodiment of the invention, the imaging surface imaged from the light valve by the fixed-focus lens in the magnified side is a part of a cylindrical surface. The second lens group further includes an aspherical lens disposed in the light path between the first lens group and the first free form lens. The aspherical lens and the first free form lens both have negative refractive power, and the free form refractive mirror is a convex mirror for example. The aspherical lens and the first free form lens are respectively a convex-concave lens with a concave surface facing the reduced side for example. The first lens group includes a second free form lens, and the second free form lens is nearest to the reduced side in the first lens group.

In one embodiment of the invention, the first lens group includes a first lens, a second lens, a third lens, a fourth lens, a fifth lens, a sixth lens, and a seventh lens arranged in sequence from the reduced side to the magnified side. The first lens is the second free form lens for example, and refractive powers of the first lens, the second lens, the third lens, the fourth lens, the fifth lens, the sixth lens, and the seventh lens are respectively positive, positive, negative, positive, positive, negative, and positive.

In one embodiment of the invention, the first lens is, for example, a concave-convex lens with a concave surface facing the reduced side, the second lens is, for example, a biconvex lens, the third lens is, for example, a convex-concave lens with a convex surface facing the reduced side, the fourth lens is, for example, a biconvex lens, the fifth lens is, for example, a biconvex lens, the sixth lens is, for example, a convex-concave lens with a concave lens facing the reduced side, and the seventh lens is, for example, a biconvex lens. The third lens and the forth lens form a double cemented lens, and the fifth lens and the sixth lens form another double cemented lens. The fixed-focus lens has an optical axis, and the offset of the light valve relative to the optical axis is more than 100%.

Another embodiment of the invention provides an imaging system including the above mentioned fixed-focus lens and a curved screen. The curved screen is disposed at the magnified side, wherein the imaging surface imaged from the light valve by the fixed-focus lens in the magnified side and the curved screen substantially coincide with each other.

In summary, the embodiment or embodiments of the invention may have at least one of the following advantages: the fixed-focus lens of the embodiment of the invention generates a curved imaging surface by using the free form lens and the free form reflective mirror, and the curved imaging surface is capable of being projected onto the curved screen in the imaging system. In this way, a curved image is generated, and the in-situ feel of the users is increased. In addition, in the imaging system of the embodiment of the invention, the curved imaging surface substantially coincides with the curved screen, so that the image has the advantages of low geometric distortion, large effective pixel number, and high illumination.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1A is a side view of an imaging system according to one embodiment of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In the specification, the free form lens is the lens having a free form curved surface, and the free form reflective mirror is the reflective mirror having a free form curved surface, wherein the free form curved surface is any curved surface expressed by mathematical expressions, and the curved surface may be non-axisymmetrical.

Figure 1B:
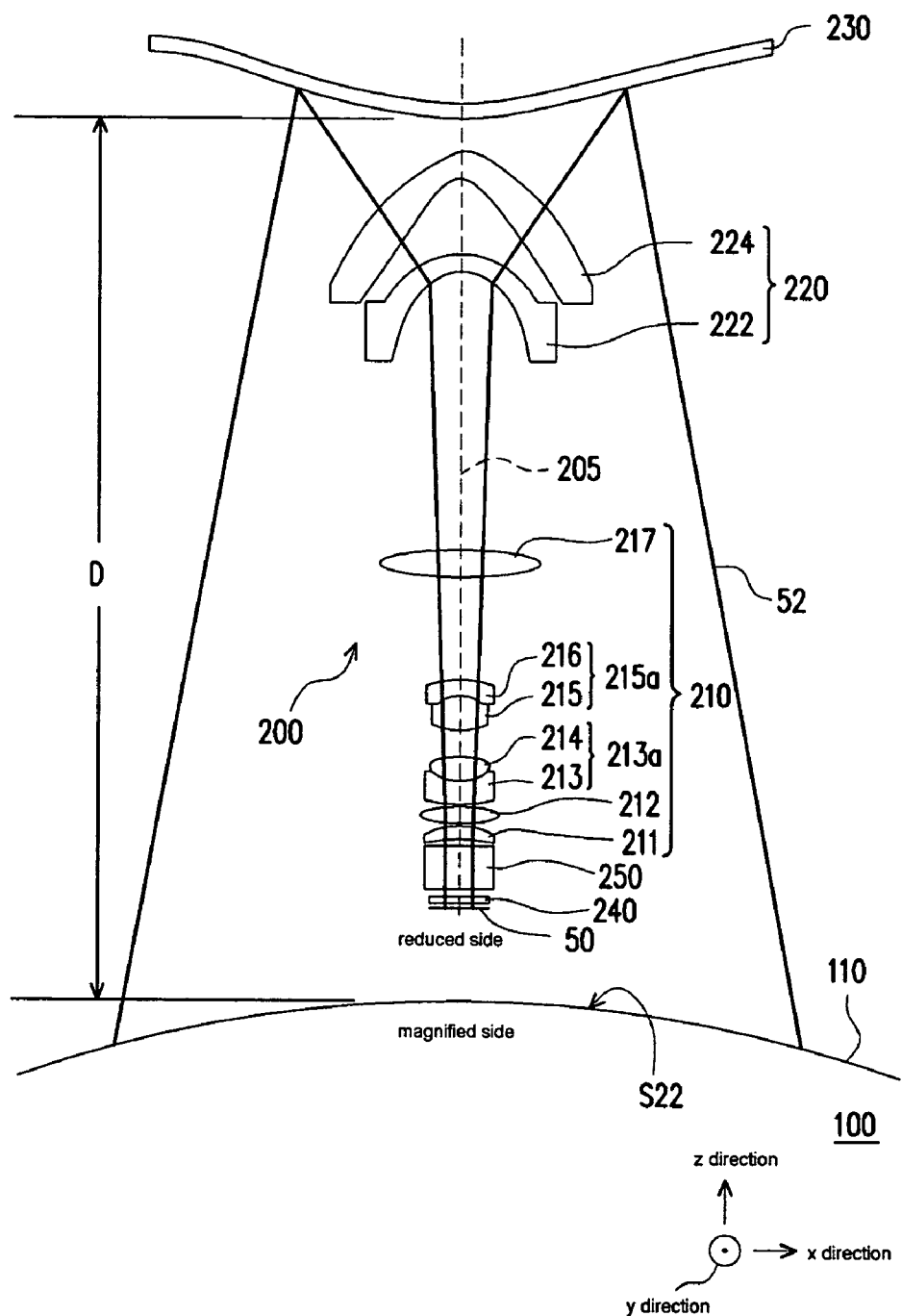
FIG. 1B is a top view of the imaging system in FIG. 1A.

Please refer to FIGS. 1A and 1B, x direction is, for example, parallel to the ground, y direction is, for example, perpendicular to the ground and x direction, and z direction is, for example, parallel to the ground and perpendicular to x direction and y direction. An imaging system 100 of the embodiment includes a fixed-focus lens 200 and a curved screen 110. The fixed-focus lens 200 is adapted to a projection apparatus (now shown), and is capable of imaging a light valve 50 of the projection apparatus disposed at a reduced side onto a magnified side. In the embodiment, the light valve 50 is, for example, a digital micro-mirror device, the light valve 50 is capable of generating an imaging beam 52, and the fixed-focus lens 200 is capable of projecting the imaging beam 52 onto the curved screen 110 disposed at the magnified side.

The fixed-focus lens 200 includes a first lens group 210, a second lens group 220, and a free form reflective mirror 230. The first lens group 210 is disposed in the light path between the reduced side and the magnified side. In the embodiment, the first lens group 210 includes a free form lens, and the free form lens is nearest to the reduced side in the first lens group 210. To be specific, the first lens group 210 includes a first lens 211, a second lens 212, a third lens 213, a fourth lens 214, a fifth lens 215, a sixth lens 216, and a seventh lens 217 arranged in sequence from the reduced side to the magnified side. The first lens 211 is the free form lens for example, and refractive powers of the first lens 211, the second lens 212, the third lens 213, the fourth lens 214, the fifth lens 215, the sixth lens 216, and the seventh lens 217 are, for example, respectively positive, positive, negative, positive, positive, negative, and positive. In the embodiment, the second lens 212, the third lens 213, the fourth lens 214, the fifth lens 215, the sixth lens 216, and the seventh lens 217 are, for example, spherical lenses.

In the embodiment, the first lens 211 is, for example, a concave-convex lens with a concave surface facing the reduced side, the second lens 212 is, for example, a biconvex lens, the third lens 213 is, for example, a convex-concave lens with a convex surface facing the reduced side, the fourth lens 214 is, for example, a biconvex lens, the fifth lens 215 is, for example, a biconvex lens, the sixth lens 216 is, for example, a convex-concave lens with a concave surface facing the reduced side, and the seventh lens 217 is, for example, a biconvex lens. In addition, the third lens 213 and the forth lens 214 form a double cemented lens 213a, and the fifth lens 215 and the sixth lens 216 form another double cemented lens 215a.

The second lens group 220 is disposed in the light path between the first lens group 210 and the magnified side and includes a ninth lens 224, wherein the ninth lens 224 is a free form lens. In the embodiment, the second lens group 220 further includes a eighth lens 222, and the eighth lens 222 is, for example, an aspherical lens. The eighth lens 222 is disposed in the light path between the first lens 210 and the ninth lens 224. In addition, in the embodiment, the eighth lens 222 (that is the aspherical lens) and the ninth lens 224 (that is the free form lens) are respectively a convex-concave lens with a concave surface facing the reduced side.

The free form reflective mirror 230 is disposed in the light path between the second lens group 220 and the magnified side, and in the embodiment, the free form reflective mirror 230 is, for example, a convex mirror. In addition, an imaging surface S22 imaged from the light valve 50 by the fixed-focus lens 200 at the magnified side is a curved surface, and the imaging surface S22 and the curved screen 110 substantially coincide with each other. In the embodiment, the imaging surface S22 is, for example, a part of a cylindrical surface, in other word, the imaging surface S22 is curved in x direction and is not curved in y direction. Furthermore, the curved screen 110 is also curved in x direction and is not curved in y direction. In the specification, the coincidence of the imaging surface S22 with the curved screen 110 is defined that the imaging surface S22 and the curved screen 110 locate at the same curved plane in the space, but the sizes of the curved screen 110 and the imaging surface S22 are not limited to be the same. In the embodiment, the curved screen 110 may have a size roughly same as the imaging surface S22, or have a size little bigger than the imaging surface S22.

The fixed-focus lens 200 of the embodiment uses the free form lens (that is the ninth lens 224 or the ninth lens 224 and the first lens 211) and the free form reflective mirror 230 to generate the curved imaging surface S22, and the curved imaging surface S22 is capable of being projected to the curved screen 110 in the imaging system. In this way, the curved image is generated, and the in-situ feel of the users is increased.

In addition, when the conventional projection apparatus projects the image on the curved screen, the imaging surface is a plane and may not coincide with the curved screen, so the conventional technology corrects the geometric distortion by adopting the method of signal process. However, the number of the effective pixels may be reduced, and the illumination of the image may be reduced too. In comparison, in the imaging system 100 of the embodiment, the curved imaging surface S22 and the curved screen 110 are substantially coincide with each other, so the image has the advantages of low geometric distortion, large effective pixel number, and high illumination.

Moreover, the imaging surface S22 and the curved screen 110 substantially coincide with each other, so imaging system 100 of the embodiment may provide an image with high quality. In more detail, the ninth lens 224 adopting the free form lens may correct the astigmatism in x direction and y direction, and may correct the astigmatism in the direction formed by the component of x direction and the component of y direction. Besides, the coincidence of the imaging surface S22 with the curved screen 110 may improve the resolution of the full field.

In addition, the free form reflective mirror 230 may adjust the imaging position of each field on the screen 110 by the relationship of the variation of curvature with the position. Moreover, the curvature of field generated by the free form reflective mirror 230 and the curvature of field generated by the lens group (including the first lens group 210 and the second lens group 220) may compensate with each other to improve the distortion and the curvature of field of the image.

Figure 2:
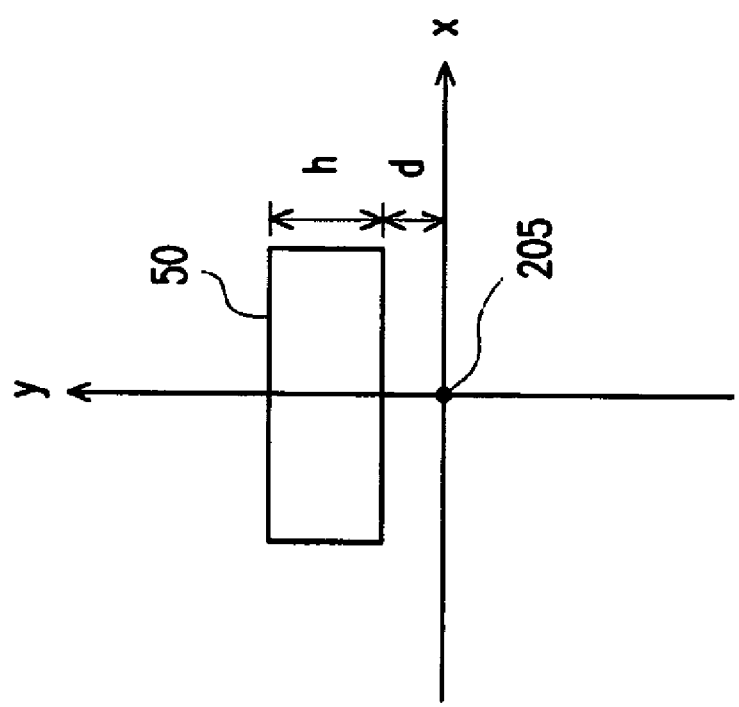
FIG. 2 is a diagram of the offset of the light valve.

The fixed-focus lens 200 has an optical axis 205, and the offset of the light valve 50 relative to the optical axis 205 is more than 100%. The definition of the optical axis 205 is specified through FIG. 2. Please refer to FIG. 2, the offset of the light valve 50 is defined as $$\text{offset} \equiv \frac{h+d}{h} \times 100\%$$

wherein h is the width of the light valve 50 in the offset direction, and d is the distance from one side of the light valve 50 near to the optical axis 205 to the optical axis 205. When the optical axis 205 and the light valve 50 do not intersect with each other, the value of d is positive. When the optical axis 205 intersects the border of the light valve 50, the value of d is 0. When the optical axis 205 passes through the area in the light valve 50, the value of d is negative.

In the embodiment, the offset of the light valve 50 relative to the optical axis 205 is, for example, 120%, so that the imaging beam 52 may not be reflected back to the second lens 220 again after the imaging beam 52b is reflected by the free form reflective mirror 230.

The followings list an embodiment of the fixed-focus lens 200. The data listed in Table 1 is not intended to limit the invention. Many modifications and variations may be apparent to practitioners skilled in this art and is in the range of the invention.

TABLE 1

| Surface | Radius of curvature (mm) | Interval (mm) | Refractive index | Abbe number | Remark |
|---|---|---|---|---|---|
| S0 | Infinite | 0.48 | | | Light valve |
| S1 | Infinite | 3 | 1.49 | 70.44 | Cover glass |
| S2 | Infinite | 2 | | | |
| S3 | Infinite | 26 | 1.52 | 64.14 | Internal total reflection prism |
| S4 | Infinite | 7 | | | |
| S5 | Y: −118.9 X: −105.6 | 2.81 | 1.61 | 43.71 | The first lens |
| S6 | Y: −57.47 X: −54.46 | 0.19 | | | |
| S7 | 49.3 | 7.57 | 1.74 | 44.79 | The second lens |
| S8 | −239.21 | 10.69 | | | |
| S9 | 87.75 | 6.03 | 1.75 | 35.28 | The third lens |
| S10 | 24.86 | 7.27 | 1.5 | 81.55 | The fourth lens |
| S11 | −159.79 | 0.2 | | | |
| S12 | 176.08 | 6.46 | 1.5 | 81.55 | The fifth lens |
| S13 | −27 | 15 | 1.75 | 35.28 | The sixth lens |
| S14 | −94.27 | 82.63 | | | |
| S15 | 171.93 | 14.87 | 1.74 | 44.79 | The seventh lens |
| S16 | −221.43 | 122.41 | | | |

TABLE 1-continued

| Surface | Radius of curvature (mm) | Interval (mm) | Refractive index | Abbe number | Remark |
|---|---|---|---|---|---|
| S17 | −24.43 | 13.54 | 1.53 | 55.95 | The eighth lens |
| S18 | −25.15 | 29.88 | | | |
| S19 | −12.5 | 14.92 | 1.53 | 55.95 | The ninth lens |
| S20 | −32.22 | 114.07 | | | |
| S21 | 205.52 | −600 | | | The free form reflective mirror |
| S22 | Y: Infinite X: −6096 | | | | Imaging surface |

Figure 3:
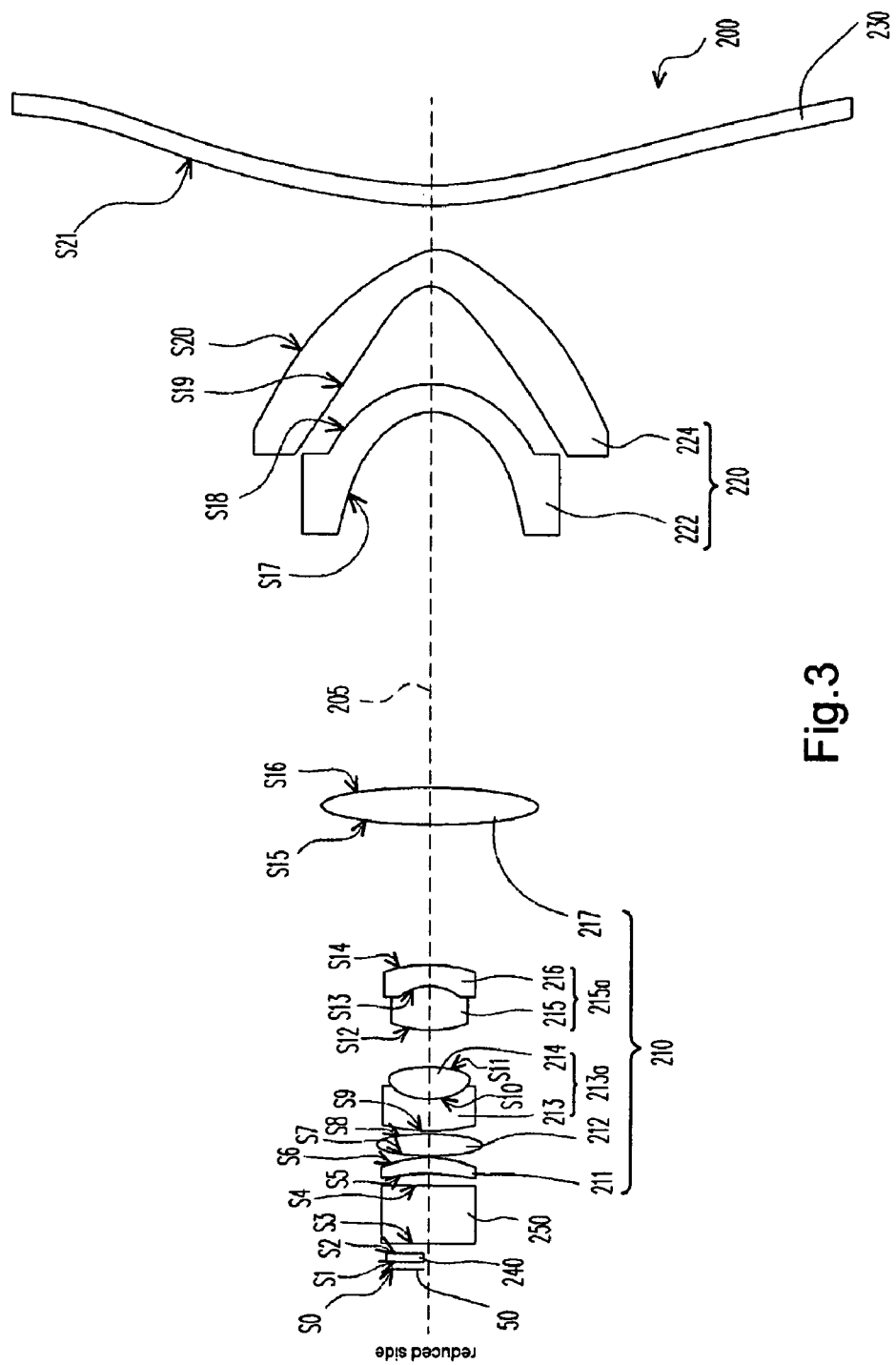
FIG. 3 is an enlarged diagram of the fixed-focus lens in FIG. 1A

Please refer to FIGS. 1A, 3, and Table 1, the interval is the straight line distance between two adjacent surfaces on the optical axis 205. For example, the interval of the surface S1 is the straight line distance between the surface S1 and the surface S2 on the optical axis 205. The thickness, the refractive index, and the Abbe number corresponding to each of the lenses in the remark column refer to the corresponding value of the interval, the refractive value, and the Abbe number in the same row. In addition, in Table 1, the surface S0 is the active surface of the light valve 50. The surfaces S1 and S2 are two surfaces of the cover glass 240, wherein the cover glass 240 is used to protect the light valve 50. The surfaces S3 and S4 are two surfaces of the internal total reflection prism 250. The surfaces S5 and S6 are two surfaces of the first lens 211, and the surfaces S7 and S8 are two surfaces of the second lens 212. The surface S9 is a surface of the second lens 213 facing to the reduced side, the surface S10 is a surface connecting the third lens 213 and the fourth lens 214, and the surface S11 is a surface of the fourth lens 214 facing to the magnified side. The surface S12 is a surface of the fifth lens 215 facing to the reduced side, the surface S13 is a surface connecting the fifth lens 215 and the sixth lens 216, and the surface S14 is a surface of the sixth lens 216 facing to the magnified side. The surfaces S15 and S16 are two surfaces of the seventh lens 217, the surfaces S17 and S18 are two surfaces of the eighth lens 222, and the surfaces S19 and S20 are two surfaces of the ninth lens 224. The surface S21 is the reflective surface of the free form reflective mirror 230, and the surface S22 (referring to FIG. 1A) is the imaging surface. In rows of the surfaces S5, S6, and S22 and line of the radius of curvature, the value behind Y represents the radius of curvature in y direction, and the value behind X represents the radius of curvature in x direction.

The radius of curvature, the interval, and other parameters of each of the surfaces refer to Table 1 and is omitted here.

The above-mentioned surfaces S17 and S18 are even-ordered polynomial aspheric surfaces that may be represented by the following equation:

$$Z = \frac{cr^2}{1 + \sqrt{1 - (1+k)c^2 r^2}} + A_2 r^2 + A_4 r^4 + A_6 r^6 + A_8 r^8 + A_{10} r^{10} + A_{12} r^{12} + A_{14} r^{14} + \ldots$$

In the equation, Z is the sag along the direction of the optical axis 205, c is the reciprocal of the radius of the osculating sphere, and is also the reciprocal of the radius of curvature near the optical axis 205 (e.g., the radius of curvatures of surfaces S18 and S19 listed in Table 1). k is the conic constant, r is the height of the aspheric surface, wherein the height is defined as the distance from the center of the lens to the edge of the lens. $A_2, A_4, A_6, A_8, A_{10}, A_{12}, A_{14}$ . . . are aspheric coefficients, and the coefficient $A_2$ is zero according to the embodiment of the invention. Table 2 lists the parameter values of surfaces S17, and S18.

TABLE 2

| Aspheric Surface Parameter | Conic Constant k | Coefficient $A_4$ | Coefficient $A_6$ | Coefficient $A_8$ |
|---|---|---|---|---|
| S17 | −0.722 | −6.839E−07 | −7.140E−10 | −2.291E−12 |
| S18 | −1.301 | 5.994E−07 | −2.447E−09 | 1.549E−12 |

| Aspheric Surface Parameter | Coefficient $A_{10}$ | Coefficient $A_{12}$ | Coefficient $A_{14}$ |
|---|---|---|---|
| S17 | 3.168E−15 | −5.282E−19 | −6.797E−23 |
| S18 | −2.067E−16 | 4.275E−21 | −3.153E−24 |

The above-described surfaces S19, S20, and S21 are even-ordered polynomial free form surfaces describable by the following equation:

$$Z = \frac{c(X^2 + Y^2)}{1 + \sqrt{1 - (1+k)c^2(X^2 + Y^2)}} + A_{2,0}X^2 + A_{0,2}Y^2 + A_{4,0}X^4 +$$
$$A_{2,2}X^2Y^2 + A_{0,4}Y^4 + A_{6,0}X^6 + A_{4,2}X^4Y^2 + A_{2,4}X^2Y^4 +$$
$$A_{0,6}Y^6 + A_{8,0}X^8 + A_{6,2}X^6Y^2 + A_{4,4}X^4Y^4 + A_{2,6}X^2Y^6 +$$
$$A_{0,8}Y^8 + A_{10,0}X^{10} + A_{8,2}X^8Y^2 + A_{6,4}X^6Y^4 + A_{4,6}X^4Y^6 +$$
$$A_{2,8}X^2Y^8 + A_{0,10}X^0Y^{10} + A_{12,0}X^{12} + A_{10,2}X^{10}Y^2 + A_{8,4}X^8Y^4 +$$
$$A_{6,6}X^6Y^6 + A_{4,8}X^4Y^8 + A_{2,10}X^2Y^{10} + A_{0,12}Y^{12} + \ldots$$

Z is the sag along the direction of the optical axis 205, c is the reciprocal of the radius of the osculating sphere, and is also the reciprocal of the radius of curvature near the optical axis 205 (e.g. the radius of curvature of surfaces S19, S20, and S21 listed in Table 1). k is the conic constant, X is the height of the free form surface along the x direction, that is the height from the centre of the lens to the edge of the lens along the x direction, Y is the height of the free form surface along the y direction, that is the height from the centre of the lens to the edge of the lens along the y direction, and $A_{2,0}, A_{0,2}, A_{4,0}, A_{2,2}, A_{0,4}, A_{6,0}, A_{4,2}, A_{2,4}, A_{0,6}, A_{8,0}, A_{6,2}, A_{4,4}, A_{2,6}, A_{0,8}, A_{10,0}, A_{8,2}, A_{6,4}, A_{4,6}, A_{2,8}, A_{0,10}, A_{12,0}, A_{10,2}, A_{8,4}, A_{6,6}, A_{4,8}, A_{2,10}, A_{0,12}$ . . . are free form coefficients. In the embodiment, $A_{2,0}$ and $A_{0,2}$ are zero. Table 3 lists the parameter values of surfaces S19, S20, and S21.

TABLE 3

| Free form parameter | Conic constant k | Coefficient $A_{4,0}$ | Coefficient $A_{2,2}$ | Coefficient $A_{0,4}$ |
|---|---|---|---|---|
| S19 | −1.305 | −3.107E−06 | −2.952E−06 | −1.323E−06 |
| S20 | −1.55 | −1.905E−07 | 9.646E−07 | 3.366E−07 |
| S21 | −2.581 | −1.078E−08 | −2.224E−08 | 6.375E−09 |

TABLE 3-continued

| Free Form Parameter | Coefficient $A_{6,0}$ | Coefficient $A_{4,2}$ | Coefficient $A_{2,4}$ | Coefficient $A_{0,6}$ |
|---|---|---|---|---|
| S19 | 2.144E−09 | 3.446E−09 | 2.101E−09 | 6.918E−10 |
| S20 | −9.824E−11 | −1.284E−09 | −1.345E−09 | −3.585E−10 |
| S21 | −1.337E−12 | −3.591E−12 | −4.019E−12 | −2.043E−12 |

| Free Form Parameter | Coefficient $A_{8,0}$ | Coefficient $A_{6,2}$ | Coefficient $A_{4,4}$ | Coefficient $A_{2,6}$ |
|---|---|---|---|---|
| S19 | 7.724E−14 | −6.579E−13 | −8.984E−13 | 3.450E−13 |
| S20 | 1.319E−13 | 5.870E−13 | 7.242E−13 | 4.191E−13 |
| S21 | −1.349E−16 | 2.127E−16 | 4.706E−16 | 3.350E−16 |

| Free Form Parameter | Coefficient $A_{0,8}$ | Coefficient $A_{10,0}$ | Coefficient $A_{8,2}$ | Coefficient $A_{6,4}$ |
|---|---|---|---|---|
| S19 | −3.814E−14 | −4.559E−16 | 5.730E−16 | 1.665E−16 |
| S20 | 7.419E−14 | −4.785E−17 | −1.005E−16 | −1.638E−16 |
| S21 | 9.217E−17 | 2.244E−20 | 2.169E−20 | −2.120E−20 |

| Free Form Parameter | Coefficient $A_{4,6}$ | Coefficient $A_{2,8}$ | Coefficient $A_{0,10}$ | Coefficient $A_{12,0}$ |
|---|---|---|---|---|
| S19 | −1.867E−16 | −7.886E−17 | −3.000E−17 | 1.424E−19 |
| S20 | −1.119E−16 | −7.429E−18 | −5.770E−18 | 5.939E−21 |
| S21 | −1.601E−20 | −1.135E−20 | −2.054E−21 | −7.098E−25 |

| Free Form Parameter | Coefficient $A_{10,2}$ | Coefficient $A_{8,4}$ | Coefficient $A_{6,6}$ | Coefficient $A_{4,8}$ |
|---|---|---|---|---|
| S19 | −1.807E−19 | −5.055E−20 | −9.694E−20 | 1.742E−19 |
| S20 | 1.047E−20 | 1.396E−20 | −2.219E−21 | 1.297E−21 |
| S21 | −2.200E−24 | 7.402E−25 | 1.994E−25 | 1.281E−25 |

| Free Form Parameter | Coefficient $A_{2,10}$ | Coefficient $A_{0,12}$ | Coefficient $A_{14,0}$ | Coefficient $A_{12,2}$ |
|---|---|---|---|---|
| S19 | −5.320E−20 | 2.268E−20 | | |
| S20 | −8.598E−21 | 7.904E−22 | | |
| S21 | 1.871E−25 | 1.329E−26 | 1.009E−29 | 6.313E−30 |

| Free Form Parameter | Coefficient $A_{10,4}$ | Coefficient $A_{8,6}$ | Coefficient $A_{6,8}$ | Coefficient $A_{4,10}$ |
|---|---|---|---|---|
| S19 | | | | |
| S20 | | | | |
| S21 | 7.176E−31 | −5.269E−31 | −4.877E−31 | −1.452E−31 |

| Free Form Parameter | Coefficient $A_{2,12}$ | Coefficient $A_{0,14}$ |
|---|---|---|
| S19 | | |
| S20 | | |
| S21 | 1.728E−31 | 3.108E−31 |

In addition, in the embodiment, the fifth surface S5 and the sixth surface S6 are bioconic surfaces. The bioconic surface is one of the free form surfaces, and is describable by the following equation:

$$Z = \frac{c_x X^2 + c_y Y^2}{1 + \sqrt{1 - (1 + k_x)c_x^2 X^2 - (1 + k_y)c_y^2 Y^2}}$$

In the equation, Z is the sag along the direction of the optical axis 205, $c_x$ is the reciprocal of the radius of the osculating sphere in the x direction, that is the reciprocal of the radius of curvature (e.g. the radius of curvature of surfaces S5 and S6 in the y direction listed in Table 1) near the optical axis 205 in the x direction, and $c_y$ is the reciprocal of the radius of the osculating sphere in the y direction, that is the reciprocal of the radius of curvature (e.g. the radius of curvature of surfaces S5 and S6 in the y direction listed in Table 1) near the optical axis 205 in the y direction. $k_x$ is the conic constant in the x direction, and $k_y$ is the conic constant in the y direction. X is the height of the boconic surface along the x direction, that is the height from the centre of the lens to the edge of the lens along the x direction, and Y is the height of the boconic surface along the y direction, that is the height from the centre of the lens to the edge of the lens along the y direction.

In the embodiment, the conic constant $k_y$ of the fifth surface S5 in the y direction is, for example, 14.304, and the conic constant $k_x$ of the fifth surface S5 in the x direction is, for example, 2.094. In addition, in the embodiment, the conic constant $k_y$ of the sixth surface S6 in the y direction is, for example, 0.655, and the conic constant $k_x$ of the sixth surface S6 in the x direction is, for example, −0.409.

Moreover, the projection distance D of the imaging system 100 of the embodiment is, for example, 600 millimetres (mm), wherein the projection distance is the distance from the vertex of the free form reflective mirror 230 to the vertex of the screen 110 in the z direction. The f-number is, for example, 2.4, so that the light valve 50 with 6.5 inches area and 16:9 aspect ratio may be projected onto the screen 110 with 85.7 inches area, and the curvature of the screen 110 in the x direction is 1/240 inches. In other word, the throw ratio of the imaging system 100 according to the embodiment may be less than 0.3, wherein the throw ratio is the ratio of the projection distance D divided by the length of the diagonal line of the image. In addition, according to the optical simulation, the TV distortion of the imaging system 100 in the horizontal direction is less than 1%, and the TV distortion of the imaging system 100 in the vertical direction is less than 3.5%.

Figure 4A:
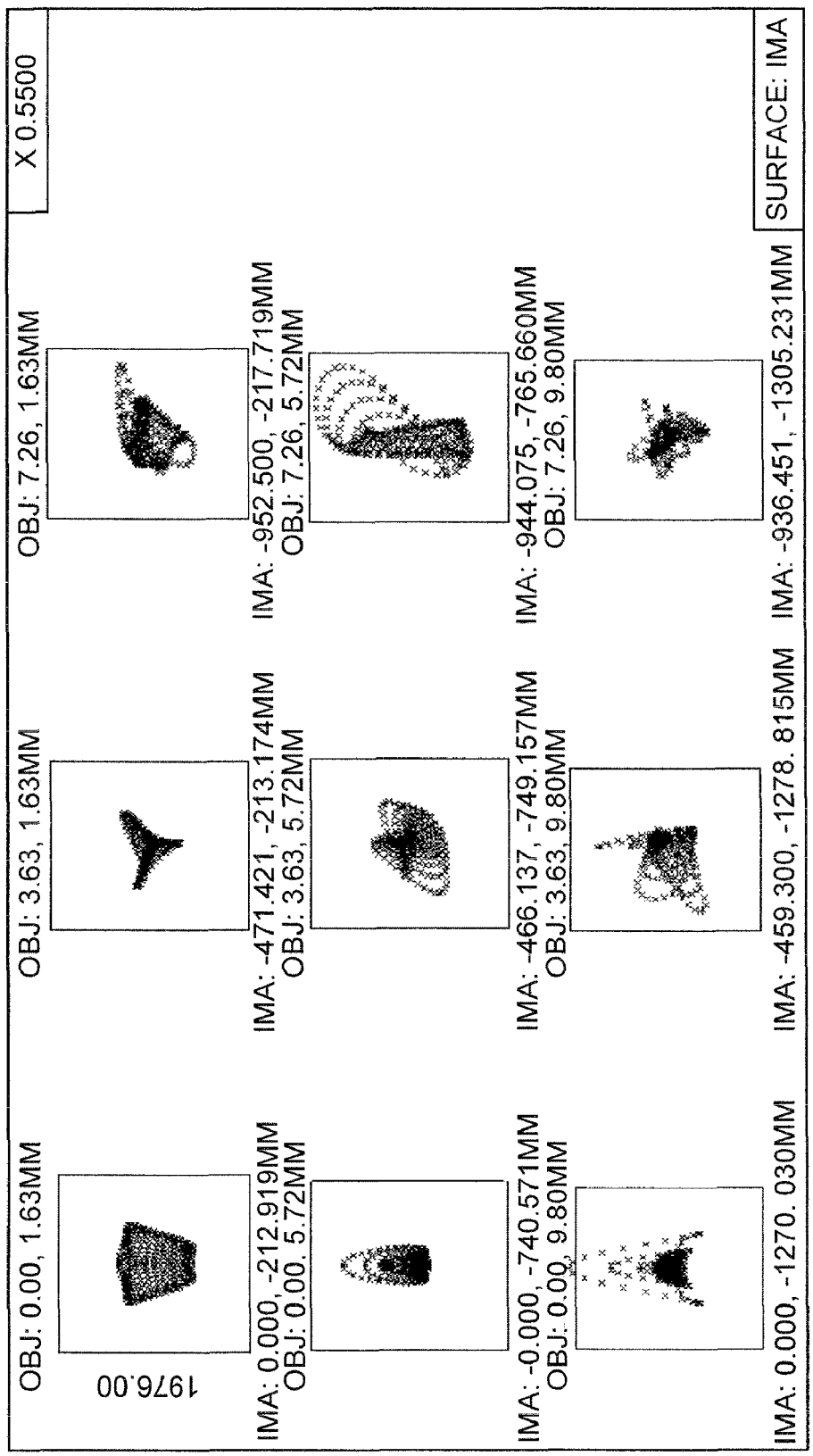
FIGS. 4A, 4B, 4C, 5A, 5B, 5C, and 5D are a imaging optical simulation data diagram of the fixed-focus lens in FIG. 1A.
Figure 4B:
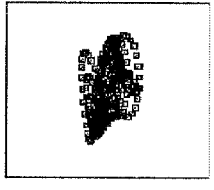
Figure 4C:
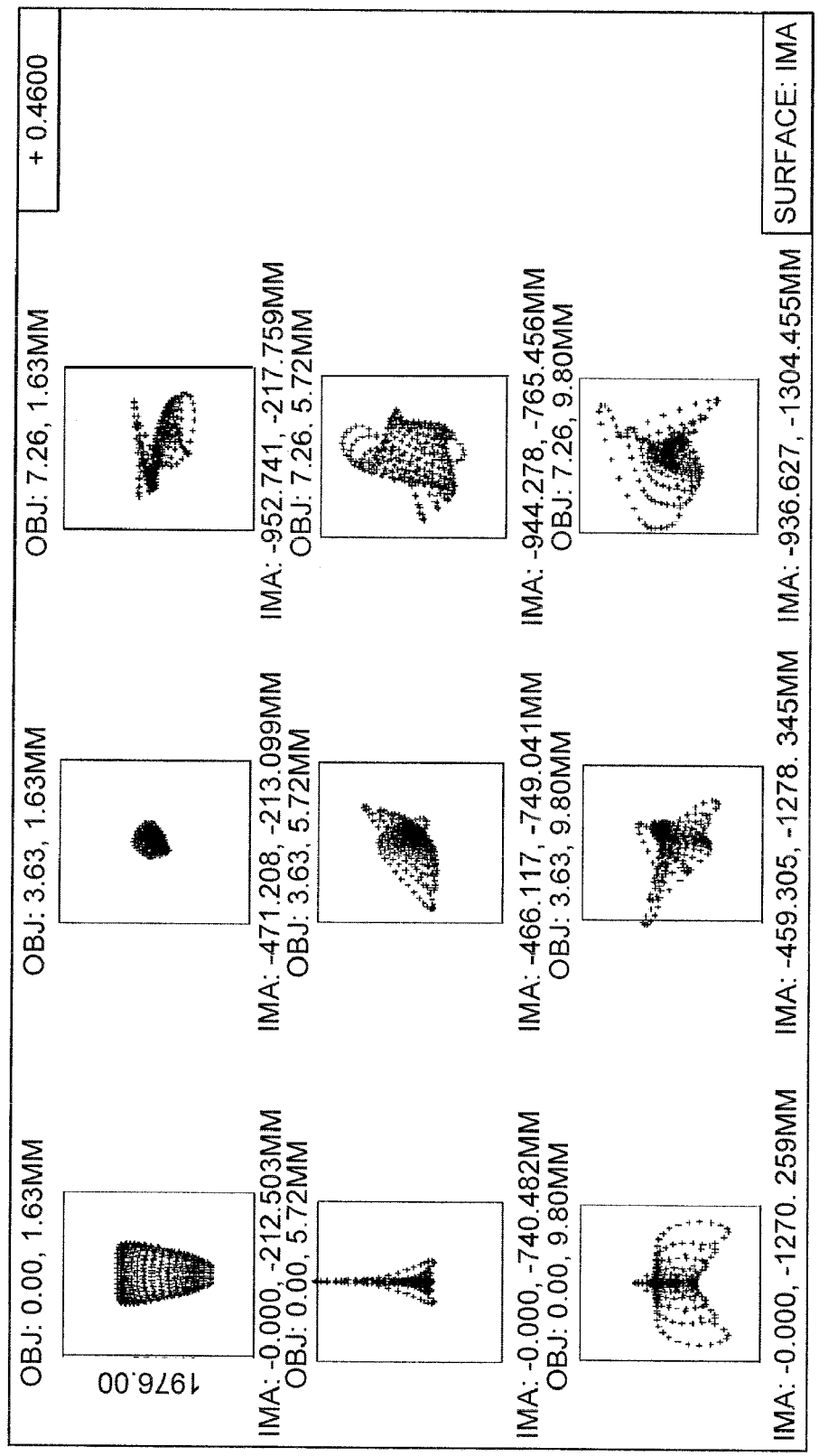
Figure 5A:
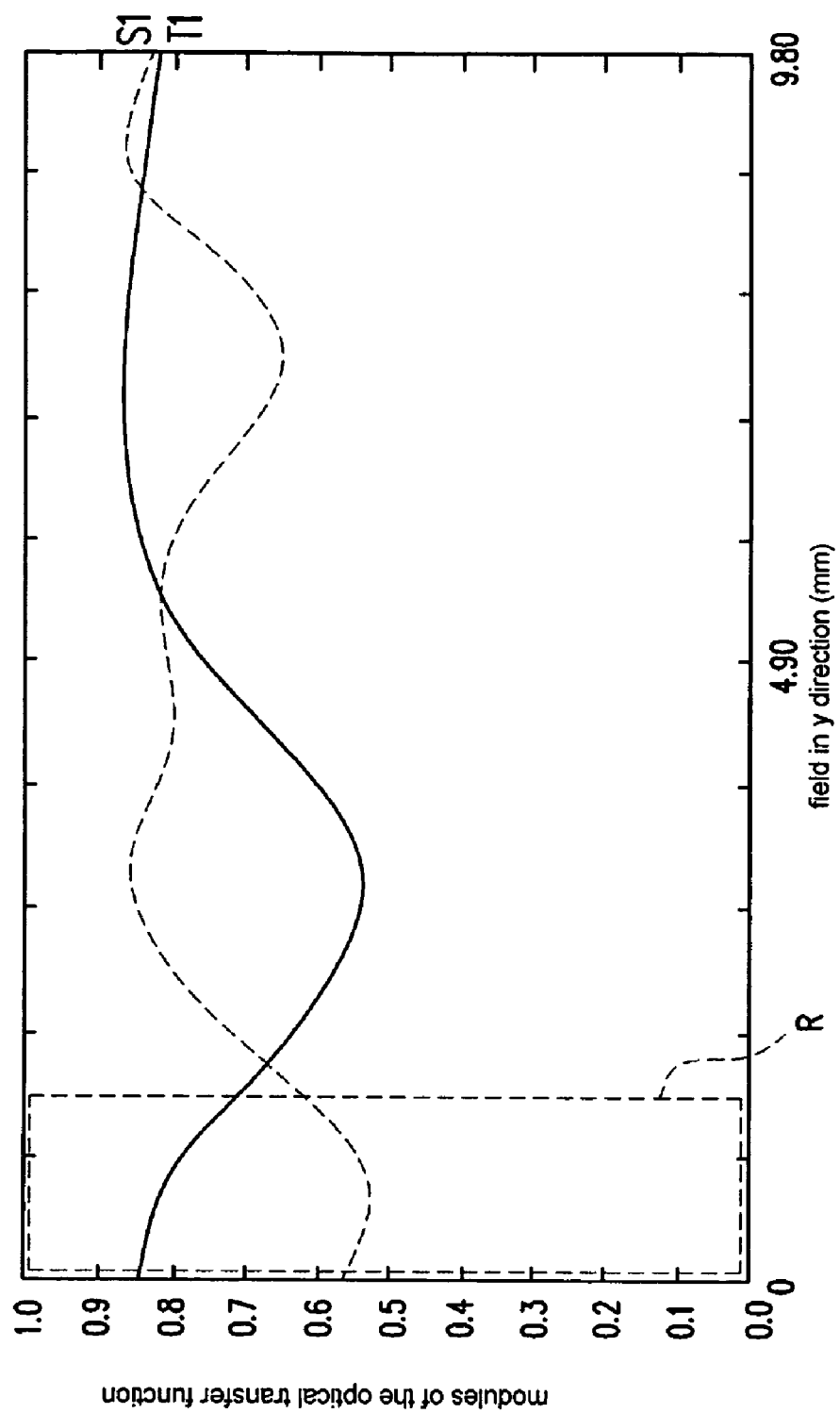
Figure 5:
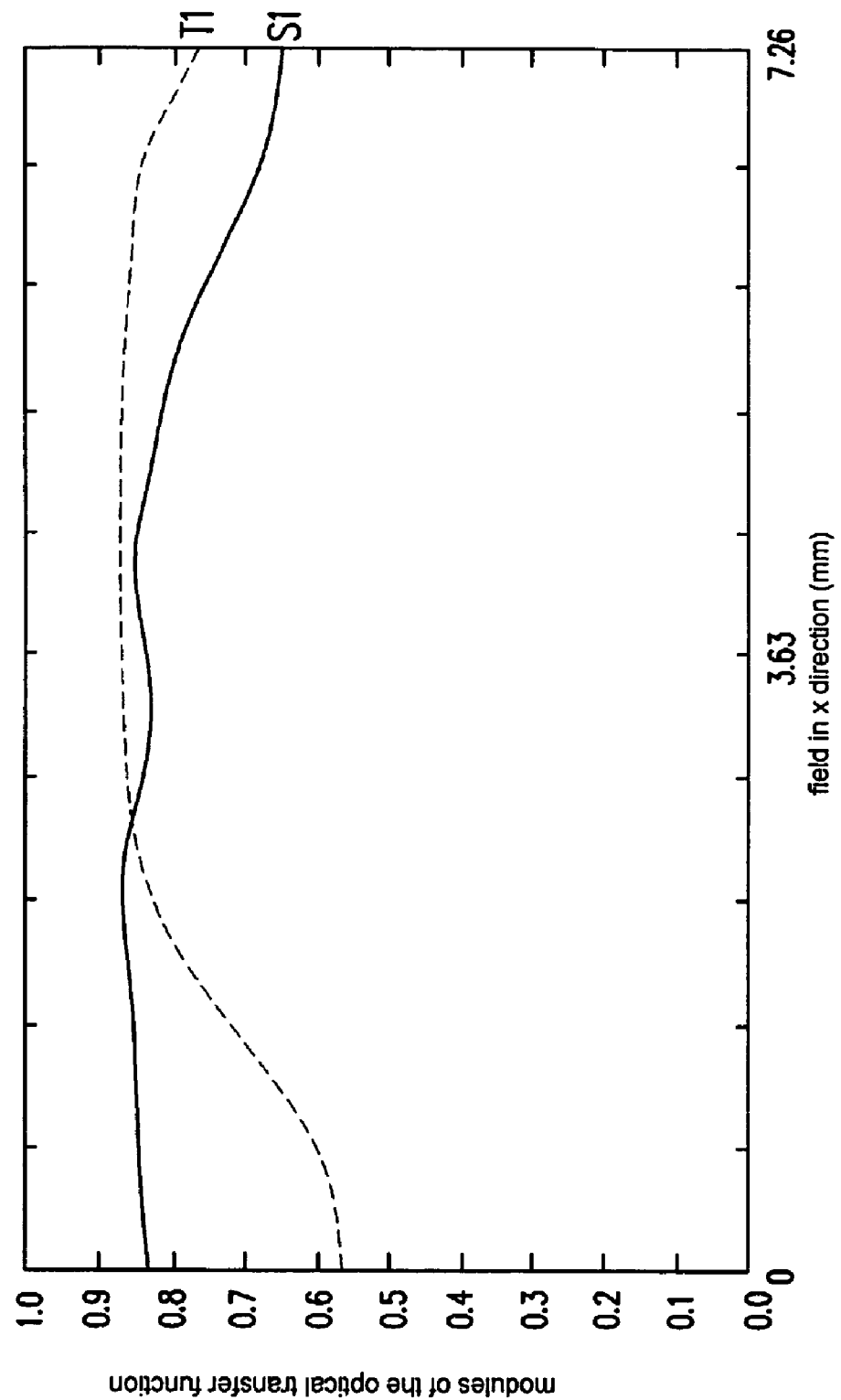
Figure 5C:
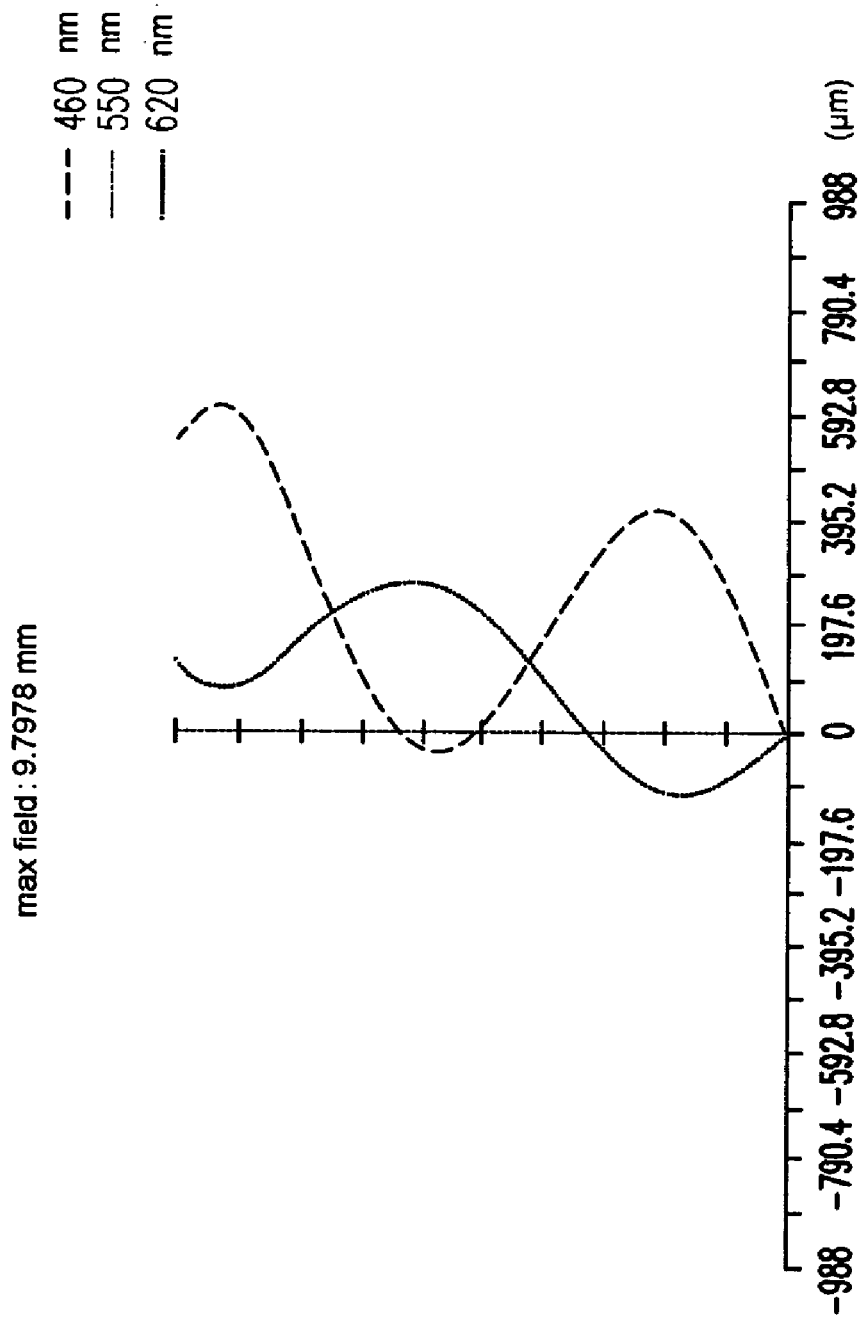
Figure 5D:
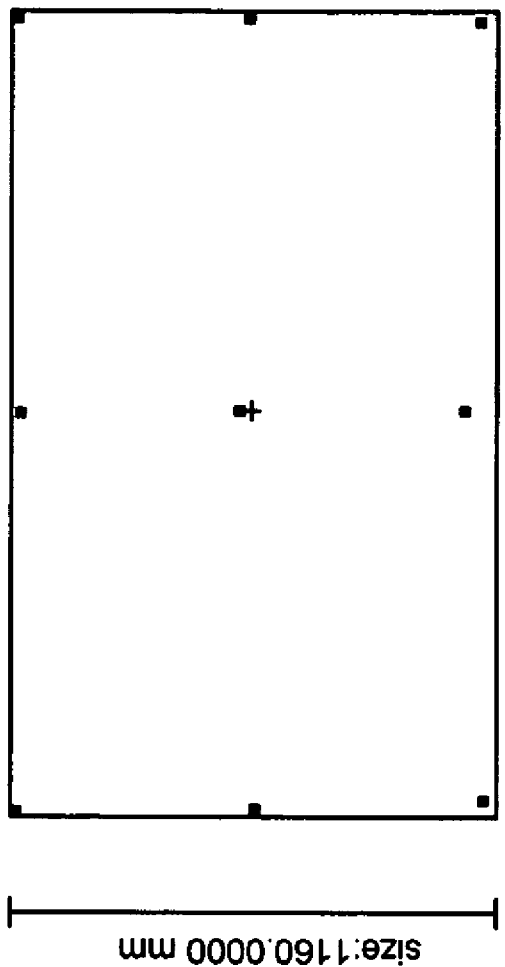

Please refer to FIGS. 4A~4C and FIGS. 5A~5D, the FIGS. 4A, 4B, and 4C are the simulating spot diagrams by respectively using a green light (the wave length is 550 nanometres (nm)), a red light (the wave length is 620 nm), and a blue beam (the wave length is 460 nm). The spot diagram shows the sizes of the spots of the different dots on the light valve projecting onto the different field of the screen. In FIGS. 4A~4C, the size of each of the panes is as big as the size of two pixels, and the geometrical sizes of all of the spots are as big as the size of one pixel approximately, so the fixed-focus lens 200 of the embodiment has good resolution. FIG. 5A shows a diagram of the geometric modulation transfer function in y direction, wherein the horizontal axis represents the field in y direction, the unit of the field is mm, and the vertical axis is the modulus of the optical transfer function. FIG. 5B shows a diagram of the geometric modulation transfer function in x direction, wherein the horizontal axis represents the field in x direction, the unit of the field is mm, and the vertical axis is the modulus of the optical transfer function. FIGS. 5A and 5B are the simulation diagrams by using a green light (the wave length is 550 nm). In FIG. 5A, the area R is an invalid area, so the offset of the light valve of the embodiment is about 120%. When the resolution is 0.506 demand pairs per mm, the geometrical modulation transfer function may be above more than 55%. FIG. 5C is the diagram of lateral color and is the simulation diagram by using the light with the wave length about 460 nm, 550 nm, and 620 nm. FIG. 5D is the footprint diagram of an image. In FIG. 5D, the size of the image is close to the size of the screen. The diagrams showed by the FIGS. 4A~4C, and 5A~5D are all in the standard range, so the fixed-focus lens 200 of the embodiment has good optical imaging quality.

Figure 6:
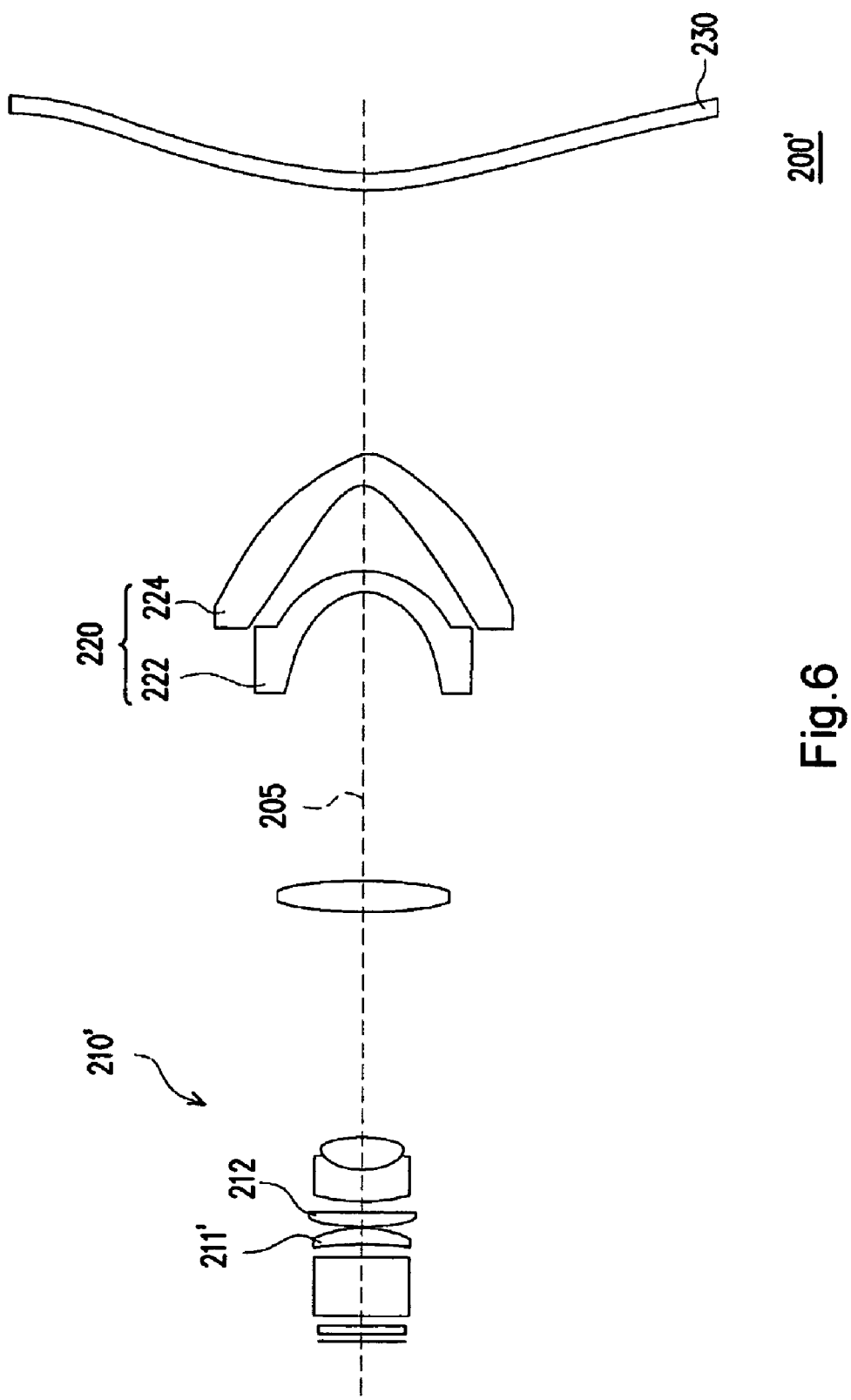
FIG. 6 is a structure diagram of a fixed-focus lens according to another embodiment of the invention.

Please refer to FIG. 6, the fixed-focus lens 200' is similar to the above-mentioned fixed-focus lens 200 (as shown in FIGS. 1A and 1B), and the major difference is that the first lens 211' of the first lens group 210' of the fixed-focus lens 200' of the embodiment is a spherical surface lens. The fixed-focus lens 200' of the embodiment has the similar advantages and effect with the fixed-focus lens 200, and detailed description thereof is omitted here.

In summary, the embodiment or embodiments of the invention may have at least one of the following advantages: the fixed-focus lens of the embodiment of the invention generates a curved imaging surface by using the free form lens (that is the ninth lens or the ninth lens and the first lens) and the free form reflective mirror. The curved imaging surface is capable of being projected onto the curved screen of the imaging system. In this way, the curved imaging surface is produced to increase the in-situ feel of the user.

In addition, when the conventional projection apparatus projects the image on the curved screen, the imaging surface is a plane and may not coincidence with the curved screen, so the conventional technology adopts the method of signal process to correct the geometric distortion, but the technology may result in reduced effective pixels and illumination of the image. Comparing with the conventional technology, in the imaging system of the embodiment of the invention, the curved imaging surface is substantially coincidence with the curved screen, so the image has the advantages of low geometrical distortion, large effective pixel number, and high illumination.

Moreover, the imaging surface and the curved screen substantially coincide with each other, so the imaging system of the embodiment may provide an image with good quality. In more detail, the ninth lens adopting the free form lens may correct the astigmatism in x direction and y direction, and may correct the astigmatism in the direction formed by the component of x direction and the component of y direction.

In addition, the free reflective mirror may adjust the imaging position on the screen of each field according to the position relation between the curvature and the position. In addition, the curvature of field produced by the free form reflective mirror and the curvature of field produced by the lens groups (including the first lens group and the second lens group) may compensate with each other to further improve the distortion and the curvature of field of the image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens capable of imaging a light valve disposed at a reduced side onto a magnified side comprising:
   a first lens group, disposed in the light path between the reduced side and the magnified side,
   a second lens group, disposed in the light path between the first lens group and the magnified side and comprising a first free form lens and an aspherical lens, the aspherical lens being disposed in the light path between the first lens group and the first free form lens, wherein the aspherical lens and the first free form lens both have negative refractive power, and a free form reflective mirror, disposed in the light path between the second lens group and the magnified side, wherein the free form reflective mirror is a convex mirror, and wherein an imaging surface imaged from the light valve by the fixed-focus lens in the magnified side is a curved surface.

2. The fixed-focus lens as claimed in claim 1, wherein the imaging surface imaged from the light valve by the fixed-focus lens in the magnified side is a part of a cylindrical surface.

3. The fixed-focus lens as claimed in claim 1, wherein the aspherical lens and the first free form lens are convex-concave lenses with a concave surface facing the reduced side.

4. The fixed-focus lens as claimed in claim 1, wherein the first lens group comprises a second free form lens, and the second free form lens is nearest to the reduced side in the first lens group.

5. The fixed-focus lens as claimed in claim 4, wherein the first lens group comprises a first lens, a second lens, a third lens, a fourth lens, a fifth lens, a sixth lens, and a seventh lens arranged in sequence from the reduced side to the magnified side, the first lens is the second free form lens, and refractive powers of the first lens, the second lens, the third lens, the fourth lens, the fifth lens, the sixth lens, and the seventh lens are respectively positive, positive, negative, positive, positive, negative, and positive.

6. The fixed-focus lens as claimed in claim 5, wherein the first lens is a concave-convex lens with a concave surface facing the reduced side, the second lens is a biconvex lens, the third lens is a convex-concave lens with a convex surface facing the reduced side, the fourth lens is a biconvex lens, the fifth lens is a biconvex lens, the sixth lens is a convex-concave lens with a concave surface facing the reduced side, and the seventh lens is a biconvex lens.

7. The fixed-focus lens as claimed in claim 5, wherein the third lens and the forth lens form a double cemented lens, and the fifth lens and the sixth lens form another double cemented lens.

8. The fixed-focus lens as claimed in claim 1, wherein the fixed-focus lens has an optical axis, and the offset of the light valve relative to the optical axis is more than 100%.

9. An imaging system, comprising:
a fixed-focus lens, capable of imaging a light valve disposed at a reduced side on to a magnified side comprising:
a first lens group, disposed in the light path between the reduced side and the magnified side;
a second lens group, disposed in the light path between the first lens group and the magnified side and comprising a first free form lens and an aspherical lens, the aspherical lens being disposed in the light path between the first lens group and the first free form lens, wherein the aspherical lens and the first free form lens both have negative refractive power; and
a free form reflective mirror, disposed in the light path between the second lens group and the magnified side, wherein the free form reflective mirror is a convex mirror, and wherein an imaging surface imaged from the light valve by the fixed-focus lens in the magnified side is a curved surface; and
a curved screen, disposed at the magnified side, wherein the imaging surface imaged from the light valve by the fixed-focus lens in the magnified side and the curved screen substantially coincide with each other.

10. The imaging system as claimed in claim 9, wherein the imaging surface imaged from the light valve by the fixed-focus lens in the magnified side is a part of a cylindrical surface.

11. The imaging system as claimed in claim 9, wherein the aspherical lens and the first free form lens are respectively a convex-concave lens with a concave surface facing the reduced side.

12. The imaging system as claimed in claim 9, wherein the first lens group comprises a second free form lens, and the second free form lens is nearest to the reduced side in the first lens group.

13. The imaging system as claimed in claim 12, wherein the first lens group comprises a first lens, a second lens, a third lens, a fourth lens, a fifth lens, a sixth lens, and a seventh lens arranged in sequence from the reduced side to the magnified side, the first lens is the second free form lens, and refractive powers of the first lens, the second lens, the third lens, the fourth lens, the fifth lens, the sixth lens, and the seventh lens are respectively positive, positive, negative, positive, positive, negative, and positive.

14. The imaging system as claimed in claim 13, wherein the first lens is a concave-convex with a concave lens facing the reduced side, the second lens is a biconvex lens, the third lens is a convex-concave lens with a convex surface facing the reduced side, the fourth lens is a biconvex lens, the fifth lens is a biconvex lens, the sixth lens is a convex-concave lens with a concave surface facing the reduced side, and the seventh lens is a biconvex lens.

15. The imaging system as claimed in claim 13, wherein the third lens and the forth lens form a double cemented lens, and the fifth lens and the sixth lens form another double cemented lens.

16. The imaging system as claimed in claim 9, wherein the fixed-focus lens has an optical axis, and the offset of the light valve relative to the optical axis is more than 100%.

* * * * *